US008188177B2

(12) United States Patent
Tarao

(10) Patent No.: US 8,188,177 B2
(45) Date of Patent: *May 29, 2012

(54) GOLF BALL

(75) Inventor: Toshiyuki Tarao, Kobe (JP)

(73) Assignee: SRI Sports Limited, Kobe (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/422,392

(22) Filed: Apr. 13, 2009

(65) Prior Publication Data

US 2009/0264222 A1 Oct. 22, 2009

(30) Foreign Application Priority Data

Apr. 21, 2008 (JP) ................................. 2008-110384

(51) Int. Cl.
*C08K 3/34* (2006.01)
*C08L 75/04* (2006.01)
*A63B 37/12* (2006.01)

(52) U.S. Cl. ........ 524/445; 524/444; 524/447; 473/378; 473/385

(58) Field of Classification Search .................. None
See application file for complete search history.

(56) References Cited

U.S. PATENT DOCUMENTS

| | | | |
|---|---|---|---|
| 5,692,974 A | 12/1997 | Wu et al. | |
| 5,851,245 A | 12/1998 | Moriyama et al. | |
| 6,051,643 A | 4/2000 | Hasegawa et al. | |
| 6,688,992 B2 | 2/2004 | Takemura et al. | |
| 6,794,447 B1 | 9/2004 | Kim et al. | |
| 7,066,836 B2 | 6/2006 | Hayashi | |
| 7,332,533 B2 | 2/2008 | Kim et al. | |
| 7,943,689 B2 * | 5/2011 | Shiga et al. | 524/445 |
| 2002/0045501 A1 | 4/2002 | Takemura et al. | |
| 2004/0048129 A1 | 3/2004 | Taft, III et al. | |
| 2004/0092336 A1 | 5/2004 | Kim et al. | |
| 2005/0059756 A1 | 3/2005 | Kim et al. | |
| 2005/0228140 A1 | 10/2005 | Rajagopalan et al. | |
| 2006/0009308 A1 * | 1/2006 | Isogawa et al. | 473/371 |
| 2006/0009585 A1 * | 1/2006 | Fujisawa et al. | 525/221 |
| 2006/0128867 A1 | 6/2006 | Marx et al. | |
| 2006/0137797 A1 * | 6/2006 | Galimberti et al. | 152/537 |
| 2006/0235128 A1 | 10/2006 | Wang et al. | |
| 2008/0214326 A1 | 9/2008 | Kim et al. | |
| 2008/0293518 A1 | 11/2008 | Shiga et al. | |
| 2009/0197706 A1 * | 8/2009 | Yamada et al. | 473/378 |
| 2010/0331115 A1 * | 12/2010 | Shiga et al. | 473/374 |

FOREIGN PATENT DOCUMENTS

| | | |
|---|---|---|
| JP | 8-302068 A | 11/1996 |
| JP | 9-124836 A | 5/1997 |
| JP | 9-183910 A | 7/1997 |
| JP | 10-168305 A | 6/1998 |
| JP | 2002-136618 A | 5/2002 |
| JP | 2002-539905 A | 11/2002 |
| JP | 2003-511116 A | 3/2003 |
| JP | 2004-504900 A | 2/2004 |
| JP | 2005-28153 A | 2/2005 |
| JP | 2005-106859 A | 4/2005 |
| JP | 2006-43447 A | 2/2006 |
| JP | 2006-346014 A | 12/2006 |
| JP | 2006-346015 A | 12/2006 |
| JP | 2008-289674 A | 12/2008 |
| KR | 10-2005-0112693 A | 12/2005 |
| WO | WO 00/57962 A1 | 10/2000 |
| WO | WO 01/24888 A | 4/2001 |

OTHER PUBLICATIONS

Laviosa Chimica Mineraria product literature for DELLITE 67G (no date).*
Toprak, A New Route to the Synthesis of Nanocomposites by Using an Unsaturated Polyester Matrix; Thesis submitted to the Graduate School of Natural and Applied Sciences of Middle East Techniocal University; Sep. 2004; pp. 1-116.*
Choi et al., "Synthesis of chain-extended organifier and properties of polyurethane/clay nanocomposites", Polymer, vol. 45, 2004, pp. 6045-6057.
English language Japanese Office Action for Application No. 2009-154269 dated Jul. 26, 2011.
Inagaki et al., "Synthesis and characterization of highly ordered mesoporous material; FSM-16, from a layered polysilicate", Studies in Surface Science and Catalysis, vol. 84, 1994, pp. 125-132.
Inagaki et al., "Synthesis of New Mesoporous Material by Folding Silicate Sheets", Science and Technology in Catalysis, 1994, pp. 143-148.
Japanese Office Action for Application No. 2007-138441 dated Apr. 28, 2009, with English translation.
Nanocor, "Nylon Nanocomposites Using Nanomer® I.24TL Nanoclay", Lit N-609 (Oct. 2004), 2 pages.
Shah et al., "Nanocomposites from poly(ethylene-co-methacrylic acid) ionomers: effect of surfactant structure on morphology and properties", Polymer, vol. 46, 2005, pp. 2646-2662.
U.S. Office Action for U.S. Appl. No. 12/153,682 dated Sep. 17, 2010.
U.S. Office Action for U.S. Appl. No. 12/363,368 dated Sep. 21, 2011.
U.S. Office Action for U.S. Appl. No. 12/422,505 dated Aug. 10, 2011.

* cited by examiner

*Primary Examiner* — David Buttner
(74) *Attorney, Agent, or Firm* — Birch, Stewart, Kolasch & Birch, LLP

(57) ABSTRACT

The object of the present invention is to provide a golf ball with superior abrasion resistance and resilience. The present invention provides a golf ball of the present invention comprises a core and a cover that covers the core. The cover contains a polyurethane resin and an organically modified layered silicate, and an interlayer distance of the organically modified layered silicate measured by X-ray diffraction is in a range from 2.5 nm to 15 nm.

13 Claims, 1 Drawing Sheet

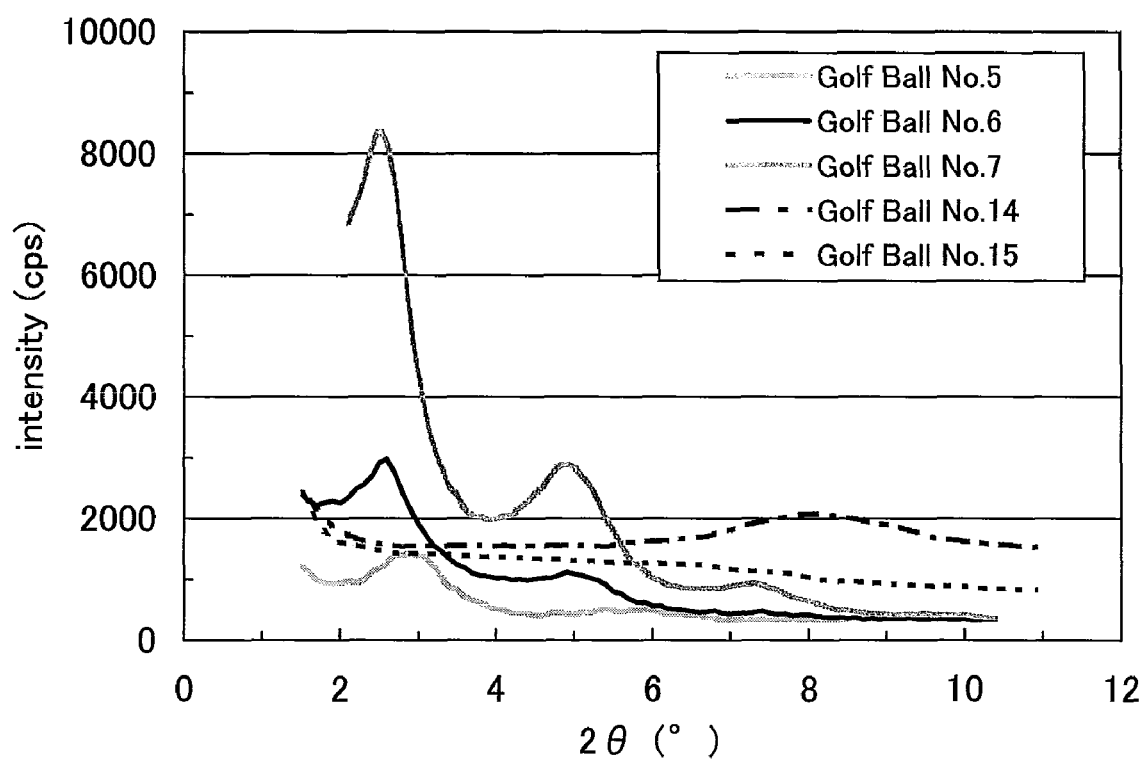

GOLF BALL

FIELD OF THE INVENTION

The present invention relates to a golf ball having superior abrasion resistance and resilience.

DESCRIPTION OF THE RELATED ART

Ionomer resins and polyurethane are used as a resin component of a cover of a golf ball. Although covers that contain ionomer resins are widely used because of their excellent resilience, it is indicated that they have inferior abrasion resistance when their rigidity or hardness is lowered. On the other hand, polyurethane is used as a resin component of a cover since the usage of polyurethane improves abrasion resistance compared to ionomer resins. However, a golf ball with a cover that contains thermoplastic polyurethane does not necessary have sufficient resilience.

There are proposals to improve characteristics of a cover by blending fillers made of organic short fibers, glass, metal, clay minerals, or the like into a resin component of a cover. For example, Japanese Patent Publication No. 2004-5049001 (patent document 1) discloses a golf ball containing a nanocomposite material that is made of a polymer having a structure in which particles of inorganic materials are reacted and substantially evenly dispersed, in which each particle has a largest dimension that is about one micrometer or less and that is at least an order of magnitude greater than such particle's smallest dimension. Further, Japanese Patent Publication No. 2006-43447 A (patent document 2) discloses a golf ball including a core and an outer layer portion surrounding the core, wherein the outer layer portion is made of a resin composition that contains cation treated layered silicates in a resin matrix.

SUMMARY OF THE INVENTION

However, the golf balls described in patent documents 1 and 2 leave potential for improving abrasion resistance and resilience of a golf ball.

The present invention has been made in view of the above problems, and the object of the present invention is to provide a golf ball having excellent abrasion resistance and resilience.

A golf ball of the present invention that can solve the above problems is a golf ball comprising a core and a cover that covers the core, wherein the cover contains a polyurethane resin and an organically modified layered silicate, and an interlayer distance of the organically modified layered silicate measured by X-ray diffraction is in a range from 2.5 nm to 15 nm.

The dispersibility of a layered silicate in a polyurethane resin which is a resin component may be enhanced by organically modifying a layered silicate surface. Furthermore, in the present invention, an organically modified layered silicate contained in a cover is not single-leaf state. Instead, an interlayer distance of the organically modified layered silicate in the cover, measured by X-ray diffraction, is adjusted in a range from 2.5 nm to 15 nm, by adjusting an amount of extension of the interlayer distance of the organically modified layered silicate when mixing the organically modified layered silicate and the polyurethane resin, or when molding the cover. When compared to a case in which organically modified layered silicate is single-sheeted, abrasion resistance and resilience of a golf ball can be improved by the adjustment.

The reason is not clear why abrasion resistance and resilience of a golf ball improves when the interlayer distance of the organically modified layered silicate contained in a golf ball cover is adjusted in the above-described range, rather than when the organically modified layered silicate is single-leaf state. However, it is presumed that the reason is because when the interlayer distance of the organically modified layered silicate in the cover is adjusted in a range from 2.5 nm to 15 nm, the polyurethane resin is tucked in an interlayer of the organically modified layered silicate in the cover, and an interaction between the polyurethane resin and the organically modified layered silicate increases, and leads to a strong reinforcement effect of the cover by the organically modified layered silicate.

The melt viscosity (210° C.) of the polyurethane resin is preferably in a range from 1,500 P to 30,000 P.

The amount of the organically modified layered silicate in the cover is preferably in a range from 0.01 to 10 parts by mass per 100 parts by mass of the polyurethane resin. A layered silicate that is organically modified by an organic ammonium ion is preferably used as the organically modified layered silicate.

The slab hardness of the cover is preferably in a range from 70 to 98 in Shore A hardness.

A manufacturing method for the golf ball of the present invention includes: an organic modification process of organically modifying a layered silicate by using an organic cation to manufacture an organically modified layered silicate; and a cover molding process of forming a cover such that the organically modified layered silicate in the cover has an interlayer distance measured by X-ray diffraction in a range from 2.5 nm to 15 nm, by using the organically modified layered silicate, a polyurethane resin, and an additive as ingredients of the cover. Adopting this manufacturing method allows a cover, which has an interlayer distance of the organically modified layered silicate measured by X-ray diffraction in a range from 2.5 nm to 15 nm, to be easily molded.

The golf ball manufacturing method of the present invention preferably comprises a nanocomposite process of mixing the organically modified layered silicate and the polyurethane resin before the cover molding process to prepare a nanocomposite urethane having an interlayer distance of a layered silicate in a range from 2.0 nm to 15 nm.

A twin-screw extruder is preferably used in the nanocomposite process for mixing the organically modified layered silicate and the polyurethane resin, using a mixing condition of a mixing temperature in a range from 140° C. to 220° C. Furthermore, mixing of the nanocomposite urethane and the additive, and injection-molding of the cover, both of which in the cover molding process are preferably conducted by using a twin-screw extruder at mixing temperature in a range from 150° C. to 220° C.

According to the present invention, a golf ball having excellent abrasion resistance and resilience is achieved.

BRIEF DESCRIPTION OF THE DRAWINGS

FIG. 1 shows X-ray diffraction patterns of sheets molded by using the nanocomposite urethane and titanium dioxide in similar manners to compositions used for molding covers of golf balls No. 5, 6, 7, 14, and 15, at injection conditions similar to the cover molding conditions.

BEST MODE FOR CARRYING OUT THE INVENTION

A golf ball of the present invention is a golf ball comprising a core and a cover that covers the core. The cover contains a polyurethane resin and an organically modified layered silicate, and an interlayer distance of the organically modified layered silicate measured by X-ray diffraction is in a range from 2.5 nm to 15 nm.

The interlayer distance of the organically modified layered silicate in the cover, measured by X-ray diffraction, is 2.5 nm or more, and preferably 2.6 nm or more, and even more preferably 2.7 nm or more, and 15 nm or less, and preferably 14.5 nm or less, and more preferably 14.0 nm or less. Adjusting the interlayer distance of the organically modified layered silicate in the cover in a range from 2.5 nm to 15 nm allows enhancement of a cover reinforcement effect by the organically modified layered silicate, thereby improving abrasion resistance and resilience of the cover. The interlayer distance of the organically modified layered silicate in the cover described in the present application, is an interlayer distance obtained by X-ray diffraction measurement of an organically modified layered silicate contained in a sheet that is molded in a sheet form with a cover composition and at an injection condition similar to a cover molding condition. The X-ray diffraction measurement is conducted by a later described measuring method.

The interlayer distance measured by X-ray diffraction in the present invention is an interlayer distance (d) value derived by the Bragg's equation (the following Formula 1) using a peak position ($\theta_m$) of a primary peak in a spectrum obtained by X-ray diffraction measurement.

[Formula 1]

$$d = \lambda/2 \sin \theta m \quad (1)$$

d: Interlayer distance (nm)
$\theta_m$: peak position of primary peak (°)
$\lambda$: wavelength of X-ray source (nm)

In other words, an interlayer distance (d) measured by X-ray diffraction being in a range from 2.5 nm to 15 nm means, for example, when measurement is conducted with CuKα radiation (A=0.15418 nm) as an X-ray, a primary peak ($\theta_m$) among the obtained X-ray spectrum is in a position of 0.294° to 1.77°.

Described next is the organically modified layered silicate used in the cover. The organically modified layered silicate is a layered silicate, in which a part or all of the metallic cations that are intrinsically contained within a layered silicate crystal interlayer are exchanged with organic cations. In the following descriptions, a layered silicate that is not organically modified is simply referred to as a "layered silicate", and a layered silicate that is organically modified is called an "organically modified layered silicate".

The layered silicate is not limited to one form, as long as it is a silicate that has a layered structure. Examples are: layered silicates of kaolinites such as kaolinite, dickite, halloysite, chrysotile, lizardite, and amesite; layered silicates of smectites such as montmorillonite, beidellite, nontronite, saponite, ferrous saponite, hectorite, sauconite, and stevensite; layered silicates of vermiculites such as dioctahedral vermiculite, and trioctahedral vermiculite; layered silicates of micas such as muscovite, paragonite, phlogopite, biotite, and lepidolite; layered silicates of brittle micas such as margarite, clintonite, and anandite; layered silicates of chlorites such as cookeite, sudoite, clinochlore, chamosite, and nimite. These layered silicates may be natural or synthetic in origin, and may be used independently or as a mixture of two or more types. Among these, layered silicates of smectites such as montmorillonite, beidellite, nontronite, saponite, ferrous saponite, hectorite, sauconite, and stevensite; and layered silicates of vermiculites such as dioctahedral vermiculite, and trioctahedral vermiculite; are preferred as a layered silicate to be used in the present invention. Among these, montmorillonite is especially preferred.

Each layer (primary particle) that constructs the layered silicate is preferably a nano size fine particle with a thickness of 10 nm or less, and preferably has a flat shape with a length of 1 μm or less, and a width of 1 μm or less. There is no limit to the size of the layered silicate, however, the size is preferably 1 μm or less, and more preferably 700 nm or less, and even more preferably 500 nm or less.

A cation exchange capacity of the layered silicate is preferably 30 meq/100 g or more, and more preferably 40 meq/100 g or more, and even more preferably 50 meq/100 g or more, and preferably 200 meq/100 g or less, and more preferably 180 meq/100 g or less, and even more preferably 160 meq/100 g or less. If the cation exchange capacity is 30 meq/100 g or more, a sufficient exchange of an organic cation is achieved during organic modification, and the interlayer distance may be widened to a desired width. If the cation exchange capacity is 200 meq/100 g or less, bonding force in the crystal interlayer is not excessively strong, and the interlayer distance may be easily widened. The cation exchange capacity is the total amount of exchangeable cation contained in a layered silicate with respect to unit mass of the layered silicate.

An organic cation used during organic modification of the layered silicate is a cation that has a carbon chain. The organic cation is not limited to one type, and examples include an organic ammonium ion, an organic phosphonium ion, and an organic sulfonium ion.

The carbon number of the carbon chain included in the organic cation is preferably 3 or more, and more preferably 4 or more, and even more preferably 5 or more, and preferably 50 or less, and more preferably 40 or less, and even more preferably 30 or less. If the carbon number of the carbon chain included in the organic cation is in a range from 3 to 50 inclusive, the interlayer distance of the layered silicate may be widened to a desired width during organic modification. The interlayer distance of the organically modified layered silicate is decided basically by the length of the carbon chain included in the organic cation, and therefore, the carbon number of the carbon chain included in the organic cation may be altered as appropriate, depending on the desired interlayer distance.

Examples of the organic ammonium ion include: primary ammonium ions, such as stearyl ammonium ion, hexyl ammonium ion, octyl ammonium ion, and 2-ethyl hexyl ammonium ion; secondary ammonium ions such as dodecyl (lauryl) ammonium ion, and octadecyl (stearyl) ammonium ion; tertiary ammonium ions such as trioctyl ammonium ion; and quaternary ammonium ions such as dioctyl dimethyl ammonium ion, and distearyl dimethyl ammonium ion. Examples of the organic phosphonium ion include stearyl phosphonium ion and the like. Examples of the organic sulfonium ion include stearyl sulfonium ion and the like. These organic cations may be used independently, or in combination of two or more types. Among these organic cations, as the organic cation used in the present invention, an organic ammonium ion is preferred, and a primary ammonium ion is more preferred, and stearyl ammonium ion is especially preferred.

A salt of the organic cation may be used as a source of the organic cation. For example, when stearyl ammonium is used as the organic cation, stearylamine hydrochloride may be used as a source, and when distearyl dimethyl ammonium is used as the organic cation, distearyl dimethyl ammonium chloride may be used as a source. The method for organic modification is described later.

An ion exchange rate of the organically modified layered silicate is preferably 50 mol % or higher, and more preferably 60 mol % or higher, and even more preferably 70 mol % or higher. If the ion exchange rate of the organically modified layered silicate is 50 mol % or higher, the dispersibility of the organically modified layered silicate in the polyurethane resin is improved. Here, an ion exchange rate of the organically modified layered silicate is, a ratio (percentage) of an amount of cations that are exchanged with an organic cation, to the total amount of exchangeable cations contained within a layered silicate before organic modification.

Furthermore, an interlayer distance of the organically modified layered silicate at a moment immediately after organic modification, that is, before being mixed with the polyurethane resin, is preferably 1.5 nm or more, and more preferably 1.8 nm or more, and even more preferably 2.0 nm or more, and preferably 15 nm or less, and more preferably 14.5 nm or less, and even more preferably 14.0 nm or less. If the interlayer distance of the organically modified layered silicate before being mixed with the polyurethane resin is 1.5 nm or more, the polyurethane resin can easily be incorporated in the interlayer of the organically modified layered silicate. This eliminates the need for a process such as dissolving each of the polyurethane resin and the organically modified layered silicate in solvents to obtain solutions thereof, and mixing the two solutions; but instead, just mixing the polyurethane resin and the organically modified layered silicate by an extruder allows insertion of the polyurethane resin into the interlayer of the organically modified layered silicate. Furthermore, if the interlayer distance of the organically modified layered silicate before being mixed with the polyurethane resin is 15 nm or less, single-sheeting of the organic layered silicate, during mixing of the polyurethane resin and the organically modified layered silicate, can be suppressed.

Described next is the polyurethane resin used in the cover as a resin component.

Examples of the polyurethane resin include: a two-component curing type polyurethane resin obtained by hardening an isocyanate group terminated urethane prepolymer with an aromatic polyamine; and a thermoplastic polyurethane resin; however, a thermoplastic polyurethane is preferred.

The thermoplastic polyurethane used in the present invention is not particularly limited, as long as it has a plurality of urethane bonds in a molecule and exhibits thermoplasticity. For example, the thermoplastic polyurethane is a reaction product obtained by reacting a polyisocyanate component with a polyol component to form urethane bonds in a molecule thereof, where necessary, obtained by further carrying out a chain extension reaction with a chain extender such as a low-molecular weight polyol and a low-molecular weight polyamine.

The polyisocyanate component, which constitutes the thermoplastic polyurethane, is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane. A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane, a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyol component constituting the thermoplastic polyurethane is not particularly limited as long as it has a plurality of hydroxyl groups, and such examples include a low-molecular weight polyol and a high-molecular weight polyol. Examples of the low-molecular weight polyol may include a diol such as ethylene glycol, diethylene glycol, triethylene glycol, propanediol, dipropylene glycol, 1,3-butanediol, 1,4-butanediol, neopentyl glycol, 1,6-hexanediol; a triol such as glycerin, trimethylol propane, and hexanetriol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is made 400 or more, the resultant polyurethane does not become too hard and the shot feeling of the golf ball is improved. The upper limit of the number average molecular weight of the high molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The polyamine component that constitutes the thermoplastic polyurethane where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The thermoplastic polyurethane has no limitation on the constitutional embodiments thereof. Examples of the constitutional embodiments are the embodiment where the polyurethane consists of the polyisocyanate component and the high-molecular weight polyol component; the embodiment where the polyurethane consists of the polyisocyanate component, the high-molecular weight polyol component and the low-molecular weight polyol component; and the embodiment where the polyurethane consists of the polyisocyanate component, the high-molecular weight polyol component, the low-molecular weight polyol component, and the polyamine component; and the embodiment where the polyurethane consists of the polyisocyanate component, the high-molecular weight polyol component and the polyamine component.

The melt viscosity (210° C.) of the thermoplastic polyurethane is preferably 30,000 P or less, and more preferably 25,000 P or less, and even more preferably 20,000 P or less, and preferably 1,500 P or more, and more preferably 3,000 P or more, and even more preferably 5,000 P or more. If the melt viscosity of the thermoplastic polyurethane is 30,000 P or less, a desirable dispersibility of the organically modified layered silicate to the thermoplastic polyurethane is obtained when melt-mixing the thermoplastic polyurethane and the organically modified layered silicate. Furthermore, the organically modified layered silicate will not be single-sheeted because an excessive shear-force is not applied on the organically modified layered silicate during melt-mixing. On the other hand, if the melt viscosity of the thermoplastic polyurethane is 1,500 P or more, an appropriate level of shear force is obtained when melt-mixing the thermoplastic polyurethane and the organically modified layered silicate, and the thermoplastic polyurethane is easily inserted in the interlayers of the organically modified layered silicate.

In the present invention, the melt viscosity (210° C.) of the thermoplastic polyurethane is a melt viscosity measured with a flow tester (Flow Tester CFT-500D, manufactured by Shimadzu Corporation) that is set with measuring conditions which are; a die diameter of 1 mm, a die length of 1 mm, a load of 294 N, and a sample temperature at 210° C.

The slab hardness of the thermoplastic polyurethane in Shore A hardness is preferably 70 or more, and more preferably 75 or more, and even more preferably 80 or more, and preferably 98 or less, and more preferably 95 or less and even more preferably 92 or less. By setting the hardness of the thermoplastic polyurethane in Shore A hardness to be 70 or more, a cover composition does not become too soft, and a desirable resilience is obtained. Furthermore, by setting the hardness of the thermoplastic polyurethane in Shore A hardness to be 98 or less, a cover composition does not become too hard, and a sufficient durability is obtained.

Specific examples of the thermoplastic polyurethane include, "Elastollan (registered trademark) XNY85A-10 (melt viscosity (210° C.): 8,600 P)", and "Elastollan XNY97A-10L (melt viscosity (210° C.): 5,700 P)", both manufactured by BASF Japan Co., Ltd.

The amount of the organically modified layered silicate in the cover, with respect to 100 parts by mass of the polyurethane resin, is preferably 0.01 parts by mass or more, and more preferably 0.05 parts by mass or more, and even more preferably 0.1 parts by mass or more, and preferably 10 parts by mass or less, and more preferably 8 parts by mass or less, and even more preferably 6 parts by mass or less. If the amount of the organically modified layered silicate in the cover, with respect to 100 parts by mass of the polyurethane resin, is 0.01 parts by mass or more, a higher improvement effect in abrasion resistance and resilience is obtained. If the amount of the organically modified layered silicate in the cover, with respect to 100 parts by mass of the polyurethane resin, is 10 parts by mass or less, the cover does not become too hard and an abrasion resistance is improved.

The cover may contain, in addition to the polyurethane, as a resin component, another resin component as long as it does not impair the effects of the present invention. In one preferable embodiment of the present invention, the resin component in the cover composition consists of the thermoplastic polyurethane.

Examples of the other resin component include an ionomer resin, a thermoplastic elastomer, and the like. Specific examples of the ionomer resin include "Himilan (registered trademark)" commercially available from Du Pont-Mitsui Polychemicals Co., Ltd, and the like. Specific examples of the thermoplastic elastomer include: a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd., or a commercial name of "Primalloy (registered trademark) (e.g. "Primalloy A1500")" commercially available from Mitsubishi Chemical Corporation; a thermoplastic polystyrene elastomer having a commercial name of "Rabalon (registered trademark)" commercially available from Mitsubishi Chemical Corporation; and the like.

The cover may contain, in addition to the resin component, a pigment component such as titanium oxide and a blue pigment, a specific gravity adjusting agent such as calcium carbonate and barium sulfate, a dispersant, an antioxidant, an ultraviolet absorber, a light stabilizer, a fluorescent material, and a fluorescent brightener as long as they do not impair the performance of the cover.

The amount of the titanium oxide (white pigment), with respect to 100 parts by mass of the thermoplastic polyurethane constituting the cover, is preferably 0.5 parts by mass or more, more preferably 1 parts by mass or more, and preferably 10 parts by mass or less, and more preferably 8 parts by mass or less. Making the amount of the white pigment equal to or more than 0.5 parts by mass with respect to 100 parts by mass of the thermoplastic polyurethane provides opacity to the cover. If the amount of the white pigment is more than 10 parts by mass, there is a possibility that the durability of the resulting cover will deteriorate.

The slab hardness of the cover in Shore A hardness is preferably 70 or more, and more preferably 75 or more, and even more preferably 80 or more, and preferably 98 or less, and more preferably 95 or less and even more preferably 92 or less. By setting the hardness of the cover in Shore A hardness to be 70 or more, the cover does not become too soft, and a sufficient resilient performance is obtained. On the other hand, by setting the hardness of the cover in Shore A hardness to be 98 or less, the cover does not become too hard, and a sufficient durability is obtained. Here, the slab hardness of the cover is a measured slab hardness of a molded sheet that is molded in a sheet form with a cover composition and at an injection condition similar to a cover molding condition. The measurement is conducted by a measuring method described later.

Described next is a manufacturing method for obtaining the golf ball of the present invention.

A golf ball manufacturing method of the present invention includes: an organic modification step of organically modifying a layered silicate by using an organic cation to manufacture an organically modified layered silicate; and a cover molding step of forming a cover such that the organically modified layered silicate in the cover has an interlayer distance measured by X-ray diffraction in a range from 2.5 nm to 15 nm, by using the organically modified layered silicate, a polyurethane resin, and an additive as ingredients of the cover. Furthermore, the golf ball manufacturing method of the present invention preferably has a nanocomposite step of mixing the organically modified layered silicate and the polyurethane resin before the cover molding step to prepare a nanocomposite urethane having an interlayer distance of a layered silicate in a range from 2.0 nm to 15 nm.

When using an organically modified layered silicate that is organically modified beforehand (e.g. "Dellite (registered trademark) 43B" commercially available from Laviosa Chimica Mineraria S.p.A.), the step for manufacturing an organically modified layered silicate by organically modifying a layered silicate with an organic cation can be skipped.

In the organic modification step, the method for manufacturing an organically modified layered silicate by organically modifying a layered silicate with an organic cation, may be conducted by a cation-exchange reaction caused by contact of the layered silicate and the organic cation. The cation-exchange reaction may be conducted, for example, by dispersing an organic layered silicate in a dispersion medium, adding an organic cation to this dispersion medium, and stirring the mixture.

Examples of the dispersion medium for dispersing the layered silicate include water, N-methylformamide, and formamide. The layered silicate in the dispersion medium may be dispersed by mechanical stirring, and stirring time is preferably one hour or longer, and more preferably two hours or longer. In order to promote dispersion of the layered silicate, air blowing or application of ultrasound may be used together with mechanical stirring.

The temperature of the dispersion liquid used during the cation-exchange reaction is preferably 50° C. or higher, and more preferably 60° C. or higher, and even more preferably 70° C. or higher, and preferably 100° C. or lower, and more preferably 95° C. or lower, and even more preferably 90° C. or lower. Furthermore, the reaction time for the cation-exchange reaction is preferably 1 hour or longer, and more preferably 2 hours or longer, and even more preferably 3 hours or longer, and preferably 20 hours or shorter, and more preferably 18 hours or shorter, and even more preferably 15 hours or shorter.

After the reaction, an organically modified layered silicate is obtained by; filtering out the organically modified layered silicate from a reaction liquid by means of vacuum filtration, rinsing the organically modified layered silicate with water or a methanol aqueous solution thoroughly, and drying the rinsed organically modified layered silicate.

The method for manufacturing a nanocomposite urethane in the nanocomposite process by mixing an organically modified layered silicate and a polyurethane resin is not particularly limited, however, a method that uses a twin-screw extruder for the mixing is preferred.

With regard to mixing conditions when mixing the organically modified layered silicate and the polyurethane resin by the twin-screw extruder, the mixing temperature is preferably 140° C. or higher, and more preferably 150° C. or higher, and preferably 220° C. or lower, and more preferably 210° C. Furthermore, a mixing temperature from an input opening to a die may be set constant, however, a temperature gradient in a range of 140° C. to 220° C. may also be used. Furthermore, for example, when using a full flight screw (screw diameter: 2 cm), the screw L/D is preferably 25 or more, and more preferably 30 or more. The screw rotational speed is preferably 50 rpm or more, and more preferably 60 rpm or more, and preferably 200 rpm or less, and more preferably 190 rpm or less, and even more preferably 120 rpm or less.

The interlayer distance of the organically modified layered silicate contained within the nanocomposite urethane is preferably 2.0 nm or more, and more preferably 2.2 nm or more, and even more preferably 2.5 nm or more, and preferably 15 nm or less, and more preferably 14.5 nm or less, and even more preferably 14.0 nm or less. If the interlayer distance of the organically modified layered silicate contained within the nanocomposite urethane is less than 2.0 nm, the polyurethane resin is not sufficiently inserted into the interlayers of the organically modified layered silicate, and abrasion resistance may not improve. If the interlayer distance of the organically modified layered silicate contained within the nanocomposite urethane is more than 15 nm, the organically modified layered silicate transforms into an almost separated state and an interaction between the organically modified layered silicate and the polyurethane resin decreases, thus abrasion resistance may not improve.

A method for mixing the nanocomposite urethane and the additive, and injection-molding the cover in the cover molding process is not particularly limited, however, a method that uses a twin-screw extruder is preferred.

With regard to mixing conditions when mixing the nanocomposite urethane and the additive by using the twin-screw extruder, a mixing temperature is preferably 150° C. or higher, and more preferably 160° C. or higher, and preferably 220° C. or lower, and more preferably 210° C. or lower. Furthermore, a mixing temperature from the input opening to the die may be set constant, however, a temperature gradient in a range of 150° C. to 220° C. may also be used. Furthermore, for example, when using a full flight screw (screw diameter: 2 cm), the screw L/D is preferably 25 or more, and more preferably 30 or more. The screw rotational speed is preferably 50 rpm or more, and more preferably 60 rpm or more, and preferably 200 rpm or less, and more preferably 190 rpm or less, and even more preferably 120 rpm or less.

When a method that direct-injection-molds the cover material on the core is used, it is preferred if the upper and lower molds adopted for forming the cover have a hemispherical cavity and pimples, and some of the pimples are extendable and retractable to act also as hold pins. When forming the cover by injection-molding, the cover may be molded by extending out the hold pins to hold the inputted core, injecting the cover composition, and cooling the cover material. For example; a cover composition heated to a temperature of 150 to 220° C. is injected, within a time duration of 0.5 to 5 seconds, into a closed mold that is held with a pressure of 9 MPa to 15 MPa, and the mold is opened after 10 to 60 seconds of cooling.

The cover thickness of the golf ball of the present invention is preferably 0.2 mm or more, and more preferably 0.3 mm or more, and preferably 1.2 mm or less, and more preferably 1.1 mm or less, and even more preferably 1.0 mm or less. By having the cover thickness of 0.2 mm or more, the positive effect of the present invention can be obtained and the durability improves, and on the other hand, by having the cover thickness of 1.2 mm or less, sufficient resilience is obtained.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. This is because if the thickness is smaller than 5 μm, the paint film is easy to wear off due to continued use of the golf ball, and if the thickness is larger than 25 μm, the effect of the dimples is reduced, resulting in deteriorating flying performance of the golf ball.

Next, the preferable embodiment of the core of the golf ball of the present invention will be explained.

The core of the golf ball of the present invention includes a single layered core, a core consisting of a center and a single-layered intermediate layer covering the center, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "core rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the core becomes too hard, and the shot feeling may be lowered.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide, a mono-substituted diphenyl disulfide such as bis (4-chlorophenyl)disulfide, bis(3-chlorophenyl)disulfide, bis (4-bromophenyl)disulfide, bis(3-bromophenyl)disulfide, bis (4-fluorophenyl)disulfide, bis(4-iodophenyl)disulfide and bis (4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis (3,5-dibromophenyl)disulfide, bis(2-chloro-5-bromophenyl)disulfide, and bis(2-cyano-5-bromophenyl)disulfide; a tri-substituted diphenyl disulfide such as bis (2,4,6-trichlorophenyl)disulfide, and bis (2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis (2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the core rubber composition should be determined depending on the rubber composition. The press-molding is preferably carried out for 10 to 60 minutes at the temperature of 130° C. to 200° C. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The core preferably has a diameter of 39.0 mm or larger, more preferably 39.5 mm or larger, even more preferably 40.8 mm or large. If the diameter of the core is smaller than 39.0 mm, the thickness of the cover needs to be thicker than a desired thickness, resulting in the reduction of the golf ball's resilience. The upper limit of the diameter of the core is preferably, without limitation, 42.2 mm, more preferably 42.0 mm, even more preferably 41.8 mm. If the diameter of the core is larger than 42.2 mm, the thickness of the cover needs to be relatively thinner, and the protection effect of the cover may not be obtained.

A compression deformation amount (shrinking deformation amount of the core along the compression direction) of the core when applying a load from 98 N as an initial load to 1275 N as a final load is preferably 2.50 mm or more, more preferably 2.60 mm or more, even more preferably 2.70 mm or more, and is preferably 3.20 mm or less, more preferably 3.10 mm or less, even more preferably 3.00 mm or less. If the compression deformation amount is too small, the core becomes too hard, resulting in the poor shot feeling, while if the compression deformation amount is too large, the core becomes too soft, resulting in the heavy shot feeling.

It is preferable that the core of the present invention has a larger surface hardness than the center hardness. For example, if the core consists of multiple layers, it is easy to make the surface hardness larger than the center hardness. The hardness difference between the surface and the center of the core in the golf ball of the present invention is preferably 20 or larger, more preferably 25 or larger in Shore D hardness. Making the surface hardness of the core larger than the center hardness increases the launch angle and decreases the amount of spin, thereby improving the flight distance of the golf ball. The upper limit of the hardness difference between the surface and the center of the core is, without limitation, preferably 40, more preferably 35 in Shore D. If the hardness difference is too large, the durability of the golf ball tends to be lower.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to be lower. The center hardness of the core is preferably 50 or smaller, more preferably 48 or smaller, and even more preferably 45 or smaller in Shore D. If the center hardness is larger than 50 in Shore D hardness, the core becomes so hard that the shot feeling deteriorates. In the present invention, the center hardness of the core is the hardness measured with the Shore D type spring hardness tester at the central point of a cut plane of a core which has been cut into two halves.

The surface hardness of the core is preferably 45 or larger, more preferably 50 or larger, and even more preferably 55 or larger in Shore D hardness. If the surface hardness is smaller than 45, the core becomes so soft and the resilience may be lowered. The surface hardness of the core is preferably 65 or smaller, more preferably 62 or smaller, and even more preferably 60 or smaller in shore D hardness. If the surface hardness is larger than 65 in Shore D hardness, the core becomes so hard that the shot feeling may deteriorate.

The core in the golf ball of the present invention preferably has a PGA compression of 65 or more, more preferably 70 or more. The resilience reduces if the PGA compression of the core is below 65. This also makes the shot feeling too heavy because the core is too soft. The upper limit of the PGA compression of the core is not particularly limited, but is preferably 115, more preferably 110. If the PGA compression of the core exceeds 115, the core becomes too hard and the shot feeling deteriorates.

Examples of the material that constitute the intermediate layer are: thermoplastic resins such as a polyurethane resin, an ionomer resin, nylon and polyethylene; and thermoplastic elastomers such as a polystyrene elastomer, a polyolefin elastomer, a polyurethane elastomer and a polyester elastomer. Among these, the ionomer resin is preferred.

Examples of the ionomer resin include an ionomer resin prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms and $\alpha,\beta$-unsaturated carboxylic acid ester with a metal ion, or a mixture thereof.

Examples of the $\alpha,\beta$-unsaturated carboxylic acids are; acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups in the copolymer composed of ethylene and the $\alpha,\beta$-unsaturated carboxylic acid or in the terpolymer composed of ethylene, the $\alpha,\beta$-unsaturated carboxylic acid, and the $\alpha,\beta$-unsaturated carboxylic acid ester are; monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

The intermediate layer of the golf ball of the present invention may contain a specific gravity adjustment agent such as barium sulfate and tungsten, an anti-oxidant, and a pigment in addition to the above resin component.

The golf ball of the present invention is not particularly limited on a structure thereof as long as the golf ball has a core and a cover. Examples of the golf ball of the present invention include a two-piece golf ball comprising a single-layered core, and a cover covering the core; a three-piece golf ball comprising a core consisting of a center and an intermediate layer covering the center, and a cover covering the core; a multi-piece golf ball comprising a core consisting of a center and a multi-piece or multi-layer of intermediate layers covering the center, and a cover covering the core; and a wound golf ball comprising a wound core, and a cover covering the wound core. The present invention can be suitably applied to anyone of the above golf ball. Among them, the present invention can be preferably applied to the two-piece golf ball including a single-layered core, and a cover covering the core.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) X-Ray Diffraction Measurement

X-ray diffraction measurements were conducted with an X-ray diffractometer (RINT2200 V-TYPE from Rigaku Corporation) by using the following measuring conditions to measure the interlayer distance of the organically modified layered silicate, and the layered silicate contained within the nanocomposite urethane or the cover. The interlayer distance of the layered silicate contained within the cover was measured by X-ray diffraction measurement of an organically modified layered silicate contained in a sheet. This sheet was molded by using the nanocomposite urethane and titanium dioxide in a similar manner to a composition used for molding covers of each golf ball, and at injection conditions similar to cover molding conditions.

Measuring Conditions

X-ray source: CuKα radiation (wavelength λ=0.15418 nm)
Applied voltage: 40 kV
Applied current: 30 mA
Measured range: 2θ=0.01° to 10°
Measured interval: 0.01°

$2d \sin \theta = \lambda = 0.15418$ nm (θ: ½ of the peak angle (2θ)) Calculation formula (2) Degree of Dispersion The degree of dispersion of the layered silicate contained within the nanocomposite urethane was observed by using a transmission electron microscopy (TEM), and evaluated and ranked into three criteria.

Evaluation Criteria

E (Excellent): Layered silicate aggregation is not observed.

G (Good): Layered silicate aggregation could be observed.

F (Fair): A small amount of layered silicate aggregation is observed.

P (Poor): A large amount of layered silicate aggregation is observed.

(3) Core Hardness (Shore D Hardness)

A type P1 auto loading durometer manufactured by Kobunshi Keiki Co., Ltd., which comprises a Shore D type spring hardness tester which complies to ASTM-D2240 standard was used to measure a surface hardness and the center hardness of a spherical shape core. A Shore D hardness measured at a surface portion of the spherical shape core was defined as the surface hardness of the spherical shape core. The spherical shape core was cut into two hemispheres to obtain a cut plane, and a Shore D hardness measured at the center of the cut plane was defined as the center hardness of the spherical shape core.

(4) Compression Deformation Amount (mm)

An amount of compression deformation of the golf ball (an amount of compression of the golf ball in the compression direction thereof), when applying an initial load of 98 N to a final load of 1275 N to the core, was measured.

(5) Slab Hardness (Shore A Hardness)

Sheets with a thickness of approximately 2 mm were manufactured from the cover composition by hot press molding, and stored for 2 weeks at 23° C. Three or more of these sheets were stacked on one another so as not to be affected by the measuring substrate on which the sheets were placed, and the stack was measured with a type P1 auto loading durometer manufactured by Kobunshi Keiki Co., Ltd., which comprises a Shore A type spring hardness tester which complies to ASTM-D2240 standard.

(6) Coefficient of Repulsion

A 200 g aluminum cylindrical object was forced to collide with each golf ball at a speed of 40 m/sec, and the speeds of the cylindrical object and the golf ball before and after the collision were measured. Based on these speeds and the mass of each object, coefficient of repulsion for each golf ball was calculated. The measurement was conducted by using twelve of each golf ball, and the average value was regarded as the coefficient of repulsion for the golf ball. The coefficient of repulsion of golf ball No. 2 was defined as an index of 100, and the coefficient of repulsion of each golf ball was represented by converting the coefficient of repulsion of each golf ball into this index.

(7) Abrasion Resistance

A commercially available pitching wedge was installed on a swing robot manufactured by Golf Laboratories, Inc., and two points of a ball were both hit once at a head speed of 36 m/sec. Each impact point was evaluated and ranked into four criteria.

Evaluation Criteria

E (Excellent): Almost no scratches are on the surface of the golf ball

G (Good): Slight scratches are formed on the surface of the golf ball

F (Fair): The surface of the golf ball is slightly scuffed, and the scuffing could be observed.

P (Poor): The surface of the golf ball is considerably abraded, and the scuffing was conspicuous.

[Manufacturing an Organically Modified Layered Silicate]

Manufacturing Example 1

1 liter of distilled water was heated to 80° C., and 20 g of montmorillonite ("Kunipia (registered trademark) F": manufactured by Kunimine Industries Co., Ltd., cation exchange capacity: 115 meq/100 g, interlayer distance: 1 nm) was added in the water and sufficiently dispersed by stirring for three hours or longer. 7.44 g of stearylamine (manufactured by Tokyo Chemical Industry Co., Ltd.) and 2.5 ml of a 12 mol/l hydrochloric acid solution was mixed in advance, and organic modification was conducted by adding the total amount of this stearylamine hydrochloride solution mixture into the montmorillonite dispersion liquid, and by stirring the obtained reaction solution for 1 hour while heating at 80° C.

The reaction liquid after organic modification was vacuum filtered, and the obtained filtered substance was first rinsed with water, and then thoroughly rinsed with a methanol solution (water:methanol=1:1 (ratio by mass)). The obtained rinsed substance was dried for 24 hours at 60° C., resulting in 26.1 g of stearyl ammonium exchanged montmorillonite (hereinafter, may be referred to as "C18").

When measurement of X-ray diffraction was conducted for the C18, the interlayer distance of the montmorillonite was 2 nm. Furthermore, the montmorillonite amount contained within the C18 was 77 mass %, and the ion exchange rate was 100 mol %.

Manufacturing Example 2

1 liter of distilled water was heated to 80° C. and 20 g of montmorillonite ("Kunipia (registered trademark) F": manufactured by Kunimine Industries Co., Ltd., cation exchange capacity: 115 meq/100 g, interlayer distance: 1 nm) was added and sufficiently dispersed by stirring for three hours or more. Organic modification was conducted by adding 16.19 g of distearyl dimethyl ammonium chloride (manufactured by Tokyo Chemical Industry Co., Ltd.) to the montmorillonite dispersion liquid, and by stirring the obtained reaction solution for 1 hour while heating at 80° C.

The reaction liquid after organic modification was vacuum filtered, and the obtained filtered substance was first rinsed with water, and then thoroughly rinsed with a methanol solution (water:methanol=1:1 (ratio by mass)). The obtained rinsed substance was dried for 24 hours at 80° C., resulting in 34.4 g of distearyl dimethyl ammonium exchanged montmorillonite (hereinafter, may be referred to as "D18").

When measurement of X-ray diffraction was conducted for the D18, the interlayer distance of the montmorillonite was 2 nm. Furthermore, the montmorillonite amount contained within the D18 was 58 mass %, and the ion exchange rate was 100 mol %.

[Manufacturing a Nanocomposite Urethane]

A nanocomposite urethane in the form of a pellet was manufactured by mixing the C18, the D18, and a polyurethane resin in a formulation described in Table 2 by using a twin-screw extruder ("2D25S", manufactured by Toyo Seiki Seisaku-sho, Ltd.). Furthermore, a full flight screw (screw diameter 2 cm, screw L/D=25) with a screw rotational speed of 70 rpm was used as specifications of the twin-screw extruder. With regard to the mixing temperature; a temperature gradient was created at the intermixed region from the input opening to the die with temperatures of 160° C., 170° C., and 180° C., sequentially from the input opening, with the temperature of the die being at 180° C.

The interlayer distance and the degree of dispersion of the montmorillonite in each of the obtained nanocomposite urethanes were measured, and the results are described in Table 2.

[Manufacturing a Golf Ball]

(1) Manufacturing a Core

A spherical shape core with a diameter of 40.7 mm was obtained, by kneading a formulation of a core rubber composition described in Table 1, and heat-pressing the kneaded object in upper and lower molds, each having a hemispherical cavity, at a temperature of 160° C. for 13 minutes.

TABLE 1

| | Core | |
|---|---|---|
| Formulation | Polybutadiene rubber | 100 |
| | Zinc Acrylate | 33 |
| | Zinc Oxide | 12.0 |
| | Barium Sulfate | 14.0 |
| | Diphenyl Disulfide | 0.5 |
| | Dicumyl Peroxide | 0.9 |
| Properties | Center Hardness (Shore D Hardness) | 40 |
| | Surface Hardness (Shore D Hardness) | 58 |
| | Compression Deformation Amount (mm) | 2.90 |

Formulation: parts by mass
Polybutadiene Rubber: "BR18 (high-cis polybutadiene (cis content: 96% or more))", manufactured by JSR Co., Ltd.
Zinc Acrylate: "ZNDA-90S", manufactured by Nihon Jyoryu CO., Ltd
Zinc Oxide: "Ginrei R", manufactured by Toho-zinc Co., Ltd.
Barium Sulfate: "Barium Sulfate BD", manufactured by Sakai Chemical Industry Co., Ltd
Diphenyl Disulfide: Manufactured by Sumitomo Seika Chemicals Co., Ltd.
Dicumyl Peroxide: "Percumyl (registered trademark) D", manufactured by NOF Corporation.

(2) Preparation of a Cover Composition and Manufacturing a Golf Ball Body

Next, a cover composition in the form of a pellet was prepared by mixing the nanocomposite urethane obtained above and titanium dioxide with a twin-screw extruder ("2D25S", manufactured by Toyo Seiki Seisaku-sho, Ltd.), and a cover that covers the core was manufactured by direct-injection-molding the cover composition onto the core. Furthermore, a full flight screw (screw diameter: 2 cm, screw L/D=25) with a screw rotational speed of 70 rpm was used as specifications of the twin-screw extruder. With regard to the mixing temperature; a temperature gradient was created at the intermixed region from the input opening to the die with temperatures of 160° C., 170° C., and 180° C., sequentially from the input opening; and temperatures described in Table 2 and Table 3 were used as the temperature of the die. Still further, the added amount of titanium dioxide was adjusted so as to be 4 parts by mass of titanium dioxide to 100 parts by mass of the resin component contained within the nanocomposite urethane.

The surface of the obtained golf ball was treated with sandblast, marked, painted with a clear paint, and after the paint was dried at 40° C., a golf ball with a diameter of 42.7 mm was obtained.

The evaluation results of the obtained golf balls regarding the interlayer distance of the layered silicate contained in the cover, abrasion resistance, and resilience are all shown together in Table 2 and Table 3. Furthermore, FIG. 1 shows the X-ray diffraction measurements of sheets molded by using the nanocomposite urethane and titanium dioxide in similar manners to compositions used for molding covers of golf balls No. 5, 6, 7, 14, and 15, at injection conditions similar to the cover molding conditions.

TABLE 2

| | | | | | | Golf Ball No. | | | | | | | | |
|---|---|---|---|---|---|---|---|---|---|---|---|---|---|---|
| | | | | | | 1 | 2 | 3 | 4 | 5 | 6 | 7 | 8 | 9 |
| Cover | Formulation | Nanocomposite Urethane | Formulation | Resin Component | Type | A | A | A | A | A | A | A | A | A |
| | | | | | Melt Viscosity (210° C.) [Pa · s] | 8600 | 8600 | 8600 | 8600 | 8600 | 8600 | 8600 | 8600 | 8600 |
| | | | | Organically Modified layered silicate | Type | C18 | C18 | C18 | C18 | C18 | C18 | C18 | C18 | D18 |
| | | | | | Amount per 100 parts by mass of resin components [parts by mass] | 0.01 | 0.08 | 0.1 | 0.5 | 2.0 | 5.0 | 10.0 | 15.0 | 2.0 |
| | | | | Extruder Die Temperature [° C.] | | 180 | 180 | 180 | 180 | 180 | 180 | 180 | 180 | 180 |
| | | | Properties | Degree Of Dispersion | | E | E | E | E | E | E | E | E | E |
| | | | | Interlayer Distance of Layered silicate [nm] | | 2.80 | 2.87 | 2.95 | 3.00 | 3.02 | 3.45 | 3.53 | 3.60 | 3.50 |
| | | Titanium oxide | | Amount per 100 parts by mass of Resin Components in Nanocomposite Urethane [parts by mass] | | | | | | 4 | | | | |
| | Properties | Slab Hardness [Shore A] | | | | 85 | 85 | 85 | 86 | 87 | 90 | 93 | 98 | 86 |
| | Golf Ball Properties | | | Extruder Die Temperature [° C.] | | 210 | 210 | 210 | 210 | 210 | 210 | 210 | 210 | 210 |
| | | | | Cover Thickness [mm] | | 0.8 | 0.8 | 0.8 | 0.8 | 0.8 | 0.8 | 0.8 | 0.8 | 0.8 |
| | | | | Interlayer Distance of Layered silicate in Cover [nm] | | 2.80 | 2.87 | 2.95 | 3.00 | 3.02 | 3.45 | 3.53 | 3.60 | 3.50 |
| | | | | Resilience Performance | | 99 | 100 | 100 | 100 | 102 | 103 | 104 | 106 | 101 |
| | | | | Abrasion resistance | | G | G | E | E | E | G | G | F | E |

Formulation: parts by mass

TABLE 3

| | | | | | | Golf Ball No. | | | | | | | | |
|---|---|---|---|---|---|---|---|---|---|---|---|---|---|---|
| | | | | | | 10 | 11 | 12 | 13 | 14 | 15 | 16 | 17 | 18 |
| Cover | Formulation | Nanocomposite Urethane | Formulation | Resin Component | Type | D | E | A | A | A | B | C | A | A |
| | | | | | Melt Viscosity (210° C.) [Pa · s] | 27000 | 2000 | 8600 | 8600 | 8600 | 35200 | 1300 | 8600 | 8600 |
| | | | | Organically Modified layered silicate | Type | C18 | C18 | C18 | — | Mon | C18 | C18 | C18 | C18 |
| | | | | | Amount per 100 parts by mass of resin components [parts by mass] | 2.0 | 2.0 | 2.0 | — | 2.0 | 2.0 | 2.0 | 2.0 | 2.0 |
| | | | | Extruder Die Temperature [° C.] | | 180 | 180 | 180 | 180 | 180 | 180 | 180 | 180 | 180 |
| | | | Properties | Degree Of Dispersion | | G | E | G | — | F | P | E | P | E |
| | | | | Interlayer Distance of Layered silicate [nm] | | 14.8 | 2.79 | 2.87 | — | 1.01 | Separated | 2.21 | Separated | 2.41 |
| | | Titanium oxide | | Amount per 100 parts by mass of Resin Components in Nanocomposite Urethane [parts by mass] | | | | | | 4 | | | | |
| | Properties | Slab Hardness [Shore A] | | | | 86 | 86 | 86 | 85 | 87 | 86 | 87 | 85 | 86 |
| | Golf Ball Properties | | | Extruder Die Temperature [° C.] | | 210 | 210 | 150 | 210 | 210 | 210 | 210 | 140 | 230 |
| | | | | Cover Thickness [mm] | | 0.8 | 0.8 | 0.8 | 0.8 | 0.8 | 0.8 | 0.8 | 0.8 | 0.8 |
| | | | | Interlayer Distance of Layered silicate in Cover [nm] | | 14.8 | 2.79 | 2.87 | — | 1.01 | Separated | 2.21 | Separated | 2.41 |

TABLE 3-continued

|  | Golf Ball No. | | | | | | | | |
| --- | --- | --- | --- | --- | --- | --- | --- | --- |
|  | 10 | 11 | 12 | 13 | 14 | 15 | 16 | 17 | 18 |
| Resilience Performance | 99 | 101 | 101 | 98 | 98 | 97 | 99 | 98 | 97 |
| Abrasion resistance | G | G | G | G | P | F | F | P | F |

Formulation: parts by mass
Resin A: XNY85A-10 (Thermoplastic polyurethane (Shore A hardness 85, melt viscosity (210° C.): 8,600 P), manufactured by BASF Co., Ltd.)
Resin B: XNY85A-10H (Thermoplastic polyurethane (Shore A hardness 85, melt viscosity (210° C.): 35,200 P), manufactured by BASF Co., Ltd.)
Resin C: XNY85A-10L (Thermoplastic polyurethane (Shore A hardness 85, melt viscosity (210° C.): 1,300 P), manufactured by BASF Co., Ltd.)
Resin D: XNY85A-10-a (Thermoplastic polyurethane (Shore A hardness 85, melt viscosity (210° C.): 27,000 P), manufactured by BASF Co., Ltd.)
Resin E: XNY85A-10-b (Thermoplastic polyurethane (Shore A hardness 85, melt viscosity (210° C.): 2,000 P), manufactured by BASF Co., Ltd.)
Organically Modified layered silicate C18: Stearyl ammonium exchanged montmorillonite (montmorillonite content: 73 mass %, interlayer distance of layered silicate: 2.01 nm)
Organically Modified layered silicate D18: Distearyl dimethyl ammonium exchanged montmorillonite (montmorillonite content: 55 mass %, interlayer distance of layered silicate: 2.02 nm)
Layered silicate Mon: Montmorillonite manufactured by Kunimine Industries Co., Ltd., "Kunipia (registered trademark) F"

Golf balls No. 1 to No. 12 are golf balls in which the covers contain a polyurethane resin and an organically modified layered silicate, and an interlayer distance of the organically modified layered silicate measured by X-ray diffraction is in a range from 2.5 nm to 15 nm. Resilience performances and abrasion resistances of all these golf balls were superior to those of golf ball No. 13 in which the cover does not contain an organically modified layered silicate. It is obvious that golf ball No. 8 has a slightly inferior abrasion resistance due to the large amount of the organically modified layered silicate contained.

Golf ball No. 14 is a golf ball in which the cover contains a layered silicate that was not organically modified, and it is obvious that golf ball No. 14 has inferior abrasion resistance when compared to golf ball No. 13.

Golf balls No. 15 and No. 17 are golf balls in which the interlayer distances of the organically modified layered silicates contained in the covers, measured by X-ray diffraction, are more than 15 nm; in other words, these are cases in which the organically modified layered silicates are separated into a single-leaf state. It is obvious that these golf balls have inferior abrasion resistance when compared to golf ball No. 13. For golf ball No. 15, even when mixing was conducted at a temperature condition similar to golf balls No. 1 to No. 11, the resin viscosity during mixing was high because of the high melt viscosity of the polyurethane resin that was used. For golf ball No. 17, even when a polyurethane resin similar to that of golf balls No. 1 to No. 9 was used, the resin viscosity during mixing was high because of the low mixing temperature during cover molding. With both cases, because of the high resin viscosities during mixing, it is assumed that excessive shear forces were applied on the organically modified layered silicates during mixing. It is thought that these excessive shear forces are the reason why the organically modified layered silicates are separated into a single-leaf state in these golf balls.

Golf balls No 16 and No. 18 are golf balls in which the interlayer distances of the organically modified layered silicates contained in the covers, measured by X-ray diffraction, are less than 2.5 nm. It is obvious that these golf balls have inferior abrasion resistance when compared to golf ball No. 13. For golf ball No. 16, even when mixing was conducted at a temperature condition similar to golf balls No. 1 to No. 11, the resin viscosity during mixing was low because of the low melt viscosity of the polyurethane resin that was used. For golf ball No. 18, even when a polyurethane resin similar to golf balls that of No. 1 to No. 9 was used, the resin viscosity during mixing was low because of the high mixing temperature during cover molding. With both cases, because of the low resin viscosities during mixing, it is assumed that insufficient shear forces were applied on the organically modified layered silicates during mixing and that the polyurethane resins were not inserted into interlayers of the organically modified layered silicates. It is thought that the lack of insertion of the polyurethane resin in the interlayers are the reason why the interlayer distances of the organically modified layered silicates of these golf balls are not widened to 2.5 nm or more.

The present invention is suitable as a golf ball having superior abrasion resistance and resilience. This application is based on Japanese Patent application No. 2008-110384 filed on Apr. 21, 2008, the contents of which are hereby incorporated by reference.

The invention claimed is:

1. A golf ball comprising a core and a cover that covers the core, wherein
   the cover contains a polyurethane resin and an organically modified layered silicate, and
   an interlayer distance of the organically modified layered silicate measured by X-ray diffraction after molding into the cover is in a range from 2.5 nm to 15 nm.

2. The golf ball according to claim 1, wherein the interlayer distance of the organically modified layered silicate measured by X-ray diffraction is in a range from 2.6 nm to 14.5 nm.

3. The golf ball according to claim 1, wherein the interlayer distance of the organically modified layered silicate measured by X-ray diffraction is in a range from 2.7 nm to 14.0 nm.

4. The golf ball according to claim 1, wherein the melt viscosity (210° C.) of the polyurethane resin is in a range from 1,500 P to 30,000 P.

5. The golf ball according to claim 1, wherein the melt viscosity (210° C.) of the polyurethane resin is in a range from 5,000 P to 20,000 P.

6. The golf ball according to claim 1, wherein the amount of the organically modified layered silicate in the cover is in a range from 0.01 part to 10 parts by mass per 100 parts by mass of the polyurethane resin.

7. The golf ball according to claim 1, wherein the organically modified layered silicate includes a layered silicate that is organically modified by an organic ammonium ion.

8. The golf ball according to claim 7, wherein the layered silicate is at least one selected from a smectite group consisting of montmorillonite, beidellite, nontronite, saponite, ferrous saponite, hectorite, sauconite, and stevensite.

9. The golf ball according to claim 1, wherein the slab hardness of the cover is in a range from 70 to 98 in Shore A hardness.

10. A golf ball comprising a core and a cover that covers the core, wherein
the cover contains
a polyurethane resin having a melt viscosity (210° C.) ranging from 1,500 P to 30,000 P, and
an organically modified layered silicate which is obtained by modifying a layered silicate selected from a smectite group consisting of montmorillonite, beidellite, nontronite, saponite, ferrous saponite, hectorite, sauconite, and stevensite by an organic ammonium ion, and
an interlayer distance of the organically modified layered silicate measured by X-ray diffraction after molding into the cover is in a range from 2.5 nm to 15 nm.

11. A golf ball manufacturing method for manufacturing a golf ball, comprising the steps of:
organically modifying a layered silicate by using an organic cation to prepare an organically modified layered silicate;
mixing the organically modified layered silicate and a polyurethane resin to prepare a nanocomposite urethane having an interlayer distance of the layered silicate in a range from 2.0 nm to 15 nm before the cover forming step; and
forming a cover such that the organically modified layered silicate in the cover has an interlayer distance measured by X-ray diffraction after molding into the cover in a range from 2.5 nm to 15 nm, by using the nanocomposite urethane and an additive.

12. The method according to claim 11, wherein
the organically modified layered silicate and the polyurethane resin are mixed by using a twin-screw extruder at the mixing step, under a mixing condition of a mixing temperature in a range from 140° C. to 220° C.

13. The method according to claim 11, wherein
at the cover forming step, the nanocomposite urethane and the additive are mixed, and injection-molding of the cover are conducted, both by using a twin-screw extruder under a mixing temperature in a range from 150° C. to 220° C.

* * * * *